(12) United States Patent
Brandt et al.

(10) Patent No.: US 8,351,008 B2
(45) Date of Patent: Jan. 8, 2013

(54) LIQUID CRYSTAL DISPLAY WITH SEVERAL DRIVE SEGMENTS

(75) Inventors: Peter Brandt, Aschaffenburg (DE); Heiko Charle, Rüsselsheim (DE); Wilfried Schulz, Eppstein (DE)

(73) Assignee: GM Global Technology Operations LLC, Detroit, MI (US)

( * ) Notice: Subject to any disclaimer, the term of this patent is extended or adjusted under 35 U.S.C. 154(b) by 241 days.

(21) Appl. No.: 12/827,777

(22) Filed: Jun. 30, 2010

(65) Prior Publication Data

US 2010/0328597 A1 Dec. 30, 2010

(30) Foreign Application Priority Data

Jun. 30, 2009 (DE) .................. 10 2009 031 039

(51) Int. Cl.
 *G02F 1/1343* (2006.01)
(52) U.S. Cl. ................ 349/142; 349/40; 349/149
(58) Field of Classification Search .................. None
 See application file for complete search history.

(56) References Cited

U.S. PATENT DOCUMENTS

| | | | | |
|---|---|---|---|---|
| 5,897,186 A | * | 4/1999 | Smid | 349/143 |
| 6,160,349 A | * | 12/2000 | Nagai | 315/85 |
| 6,657,681 B1 | * | 12/2003 | Kawamura et al. | 349/34 |
| 6,774,970 B1 | * | 8/2004 | Sekiguchi | 349/142 |
| 7,259,809 B2 | | 8/2007 | Brandt et al. | |
| 2002/0085284 A1 | | 7/2002 | Nakamura et al. | |
| 2006/0033852 A1 | * | 2/2006 | Kim | 349/38 |
| 2009/0195996 A1 | * | 8/2009 | Isono | 361/751 |

FOREIGN PATENT DOCUMENTS

| | | |
|---|---|---|
| DE | 3309970 A1 | 9/1984 |
| DE | 10032201 A1 | 1/2002 |
| DE | 10043110 A1 | 3/2002 |
| DE | 10064921 A1 | 7/2002 |
| DE | 10129220 A1 | 12/2002 |
| DE | 10228517 A1 | 3/2003 |
| EP | 1450202 A2 | 8/2004 |
| JP | 55-11211 A * | 1/1980 |

* cited by examiner

*Primary Examiner* — Mike Stahl
(74) *Attorney, Agent, or Firm* — Ingrassia Fisher & Lorenz, P.C.

(57) ABSTRACT

A liquid crystal display is provided with several drive segments, between which at least one intermediate surface without drive segments is situated. Such liquid crystal displays are used, in particular, for displaying information contents of low information density, for example, as numerical display elements. This realizes, among other things, a simple and cost-efficient improvement of the electrostatic properties and the legibility, namely also under unfavorable light conditions. For this purpose, the intermediate surface is largely provided with at least one conductive auxiliary layer and a high-frequency connection between the auxiliary layer and a shielding potential is produced.

12 Claims, 1 Drawing Sheet

LIQUID CRYSTAL DISPLAY WITH SEVERAL DRIVE SEGMENTS

CROSS-REFERENCE TO RELATED APPLICATION

This application claims priority to German Patent Application No. 102009031039.8-32, filed Jun. 30, 2009, which is incorporated herein by reference in its entirety.

TECHNICAL FIELD

The invention pertains to a liquid crystal display with several drive segments, between which intermediate surfaces without drive segments are situated.

BACKGROUND

Liquid crystal displays are generally known and used, in particular, for displaying information contents of low information density such as, for example, as numerical display elements. In this case, the display layout is etched onto a front glass plate, which is also referred to as front plate, in the form of transparent electrodes (i.e., drive segments) that consist, for example, of indium tin oxide. The drive segments are preferably realized separately and can be driven individually. A glass backplate, which is also referred to as backplane, may be completely provided with a transparent conductive layer in order to thusly serve as a backplate electrode. Liquid crystal displays are used in various technical devices, for example, as display elements in motor vehicles.

A liquid crystal display of the initially cited type is disclosed in German Offenlegungsschrift DE 100 64 921 A1 that pertains to a liquid crystal display with a heating device. Heating devices increase the switching speeds in liquid crystal displays at low temperatures as they may occur, for example, in motor vehicles. The known liquid crystal display aims to reduce electromagnetic interferences in the system of the liquid crystal display. For this purpose, a high-frequency connection between the heating device of the liquid crystal display and a shielding potential is produced.

Under unfavorable light conditions such as, for example, intense isolation, reflections may occur that can result in display errors or an impaired legibility of the display. In order to largely prevent this, German Offenlegungsschrift 33 09 970 A1 proposes a so-called quarter-wave foil that results in a high antireflection effect for incident extraneous light in cooperation with a circular polarizer.

In this case, it is disadvantageous that such liquid crystal displays still have a high sensitivity to static charges. This can lead to undesirable switching of the liquid crystals in the corresponding region and the associated display of undesirable images. Accumulating charges furthermore can lead to damages of the liquid crystal display under unfavorable conditions. Liquid crystal displays are subject to strict requirements with respect to their ESD properties (ESD: Electrostatic Discharge) that cannot be fulfilled due to the described processes. The shielding measures described in this context in above-mentioned German Offenlegungsschrift DE 100 64 921 A1 are relatively costly.

Based on these circumstances, it would be desirable to achieve an improvement of the electrostatic properties and of the EMC properties of a liquid crystal display with very simple and cost-efficient means, and drive segments that are not selected remain invisible to the viewer under all light conditions.

SUMMARY

In a liquid crystal display of the initially cited type, it is therefore proposed that the intermediate surface is largely provided with at least one conductive auxiliary layer, and that a high-frequency connection between the auxiliary layer and a shielding potential is produced.

Due to these measures, the auxiliary layer, which could also be referred to as "Dummy Layer" below because it has no direct display function, is connected to a shielding potential by means of a high-frequency connection. Since a high-frequency connection between the auxiliary layer and the shielding potential is produced, undesirable charges and electromagnetic interferences resulting thereof can no longer occur due to the auxiliary layer. In addition, interferences originating from the drive electronics are no longer transmitted.

One significant advantage of the invention therefore can be seen in that display and functional errors of the liquid crystal display are prevented with simple means. Another advantage is that stricter requirements with respect to the ESD and EMC properties of the liquid crystal display are fulfilled.

In one advantageous embodiment of the invention, the auxiliary layer is connected to the shielding potential in a capacitive fashion. The capacitance may be connected to the auxiliary layer on the one hand and to the shielding potential on the other hand via an electric line.

According to another advantageous embodiment of the invention, the capacitive connection is realized with a capacitor. This capacitor is arranged in such a way that one terminal of the capacitor is connected to the auxiliary layer and one terminal is connected to the shielding potential. In instances, in which a direct current connection between the auxiliary layer and the shielding potential does not cause interferences, the connection between the auxiliary layer and the shielding potential may be realized with an electrically conductive element.

According to another embodiment of the invention, the liquid crystal display features a metal housing or a metalized housing that forms the shielding potential. The housing may consist of metal or be coated with a metal. Consequently, a high-frequency separation between the interior of the housing, particularly the liquid crystal display, and the surroundings is largely achieved. This means that no interferences can penetrate into the interior of the housing from outside. Likewise, interferences caused by a drive circuit are not transmitted outward and therefore cannot interfere with devices in the vicinity of the liquid crystal display. In motor vehicles, in which liquid crystal displays are frequently integrated into a combination instrument, interferences during the reception of radio or mobile telephone signals are reliably prevented.

Depending on the required shielding effect, it may suffice to produce a high-frequency connection between the liquid crystal display and a ground potential.

According to one particularly practical embodiment of the invention, the auxiliary layer is connected to the ground potential of a printed circuit board via a separate contact. This embodiment of the invention makes it possible to realize the invention in a particularly simple and cost-efficient fashion.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
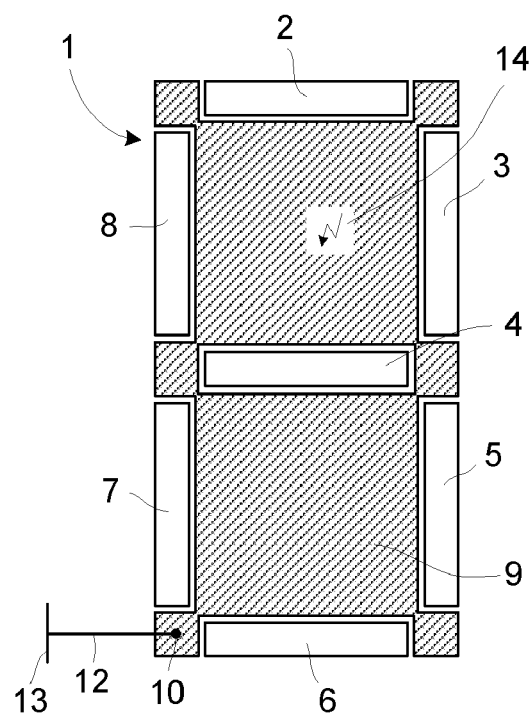
FIG. 1 shows a first exemplary embodiment of an inventive liquid crystal display.

FIG. 1 shows a liquid crystal display 1 with a plurality of separate liquid crystal segments or drive segments 2, 3, 4, 5, 6, 7, 8 and an auxiliary layer 9 that is situated in the surface areas between the drive segments 2, 3, 4, 5, 6, 7, 8 in such a way that it at least partially encloses said drive segments and almost completely fills out the surface areas. The auxiliary layer may also be referred to as "Dummy Layer" because it does not directly contribute to driving the segments, but is very important for improving the electrostatic properties and the legibility of the display. In this case, the liquid crystal segments that are not selected (i.e., the liquid crystal segments that are not driven in the respective instant and should be invisible to the viewer in the image displayed on the display) advantageously remain invisible, namely even under unfavorable light conditions such as, e.g., direct isolation.

The driving of the liquid crystal segments 2, 3, 4, 5, 6, 7, 8 is generally known from the state of the art and therefore not described in greater detail. The auxiliary layer is connected to a shielding potential 13 via a contact 10 and an electric conductor 12. Consequently, charges 14 that may accumulate on the auxiliary layer 9 are immediately diverted to the shielding potential 13. Interferences of the liquid crystal display 1 due to accumulating charges 14 therefore or prevented. This significantly improves the ESD and EMC properties, as well as the legibility of the liquid crystal display 1 under unfavorable light conditions. For example, under intense irradiation of extraneous light.

Figure 2:
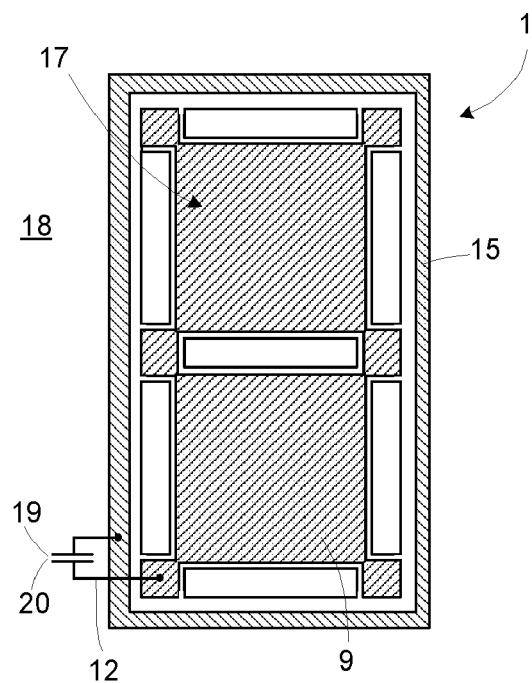
FIG. 2 shows a variation of an inventive high-frequency shield with a shielding housing.

FIG. 2 shows a liquid crystal display 1. According to FIG. 2, the liquid crystal display 1 is surrounded by a shielding housing 15 in order to realize a high-frequency separation between the inner region 17 of the shielding housing 15 and the surroundings 18. This prevents interferences due to high-frequency signals in devices that might be situated in the surroundings 18 of the liquid crystal display 1. A high-frequency connection between the auxiliary layer 9 and the shielding housing 15 is produced via the conductor 12 and a capacitance 19 in the form of a capacitor 20.

In an alternative embodiment of the invention, the liquid crystal display according to FIG. 1 and FIG. 2 may be realized in such a way that it features a projecting plate (backplane) that is connected to the ground potential via a contact pin. The electrical connection between the contact pin and the ground potential or the auxiliary layer 9, respectively, is preferably realized via a capacitor. Consequently, a high-frequency connection between the auxiliary layer of the liquid crystal display 1 and a ground potential is produced.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A liquid crystal display, comprising:
   a plurality of drive segments between which at least one intermediate surface without drive segments is situated;
   at least one conductive auxiliary layer provided along the at least one intermediate surface between the drive segments; and
   a capacitor; and
   a high-frequency connection produced between the at least one conductive auxiliary layer and a shielding potential that is connected to the at least one conductive auxiliary layer via the capacitor.

2. The liquid crystal display according to claim 1, further comprising a metal housing that forms the shielding potential.

3. The liquid crystal display according to claim 1, further comprising a metalized housing that forms the shielding potential.

4. The liquid crystal display according to claim 1, wherein the shielding potential is a ground potential.

5. The liquid crystal display according to claim 4, wherein the at least one conductive auxiliary layer is connected to the ground potential via a separate contact pin.

6. A liquid crystal display, comprising:
   a plurality of drive segments between which at least one intermediate surface without drive segments is situated;
   at least one conductive auxiliary layer provided along the at least one intermediate surface between the drive segments;
   a conductive housing that is configured to surround the plurality of drive segments and the at least one conductive auxiliary layer, wherein the conductive housing forms a shielding potential; and
   a high-frequency connection produced between the at least one conductive auxiliary layer and the shielding potential.

7. The liquid crystal display according to claim 6, wherein the at least one conductive auxiliary layer is connected to the shielding potential in a capacitive fashion.

8. The liquid crystal display according to claim 7, wherein the capacitive fashion is realized with a capacitor.

9. The liquid crystal display according to claim 6, wherein the conductive housing comprises:
   a metal housing that forms the shielding potential.

10. The liquid crystal display according to claim 6, wherein the conductive housing comprises:
    a metalized housing that forms the shielding potential.

11. The liquid crystal display according to claim 6, wherein the shielding potential is a ground potential.

12. The liquid crystal display according to claim 11, wherein the at least one conductive auxiliary layer is connected to the ground potential via a separate contact pin.

* * * * *